United States Patent [19]

Schurter

[11] Patent Number: 4,930,204

[45] Date of Patent: Jun. 5, 1990

[54] METHOD OF FORMING COMPOSITE TUBULAR STRUCTURE

[75] Inventor: Robert M. Schurter, Elm Grove, Wis.

[73] Assignee: A. O. Smith Corporation, Skokie, Ill.

[21] Appl. No.: 409,265

[22] Filed: Sep. 18, 1989

Related U.S. Application Data

[60] Continuation of Ser. No. 305,182, Feb. 1, 1989, abandoned, which is a division of Ser. No. 28,662, Mar. 20, 1987, abandoned.

[51] Int. Cl.$^5$ ............................................. B23P 17/00
[52] U.S. Cl. ................... 29/419.2; 29/469.5; 29/507; 29/516; 29/525; 228/136; 285/382; 403/278
[58] Field of Search ............ 29/419.2, 507, 525, 29/516, 469.5; 464/181, 182, 183; 228/136; 285/382; 403/278

[56] References Cited

U.S. PATENT DOCUMENTS

| | | | |
|---|---|---|---|
| 3,313,536 | 4/1967 | Dutton et al. | 29/419.2 X |
| 4,238,539 | 12/1980 | Yates et al. | 464/181 X |
| 4,451,245 | 5/1984 | Hornig | 29/525 X |
| 4,523,872 | 6/1985 | Arena et al. | 29/419.2 X |
| 4,663,819 | 5/1987 | Traylor | 29/525 X |
| 4,664,423 | 5/1987 | Rowley | 29/469.5 X |
| 4,792,320 | 12/1988 | Nickel | 464/181 |

FOREIGN PATENT DOCUMENTS

| | | | |
|---|---|---|---|
| 227203 | 9/1985 | Fed. Rep. of Germany | 464/182 |
| 3421191 | 12/1985 | Fed. Rep. of Germany | 464/181 |
| 52264 | 4/1979 | Japan | 464/181 |

*Primary Examiner*—Charlie T. Moon
*Attorney, Agent, or Firm*—Andrus, Sceales, Starke & Sawall

[57] ABSTRACT

A composite tubular structure, such as a vehicle drive shaft. The ends of a fiber reinforced resin tubular member are formed with a plurality of longitudinal slots and each slotted end of the tubular member is positioned in overlapping relation with a cylindrical sleeve portion of a metal yoke. A cylindrical metal collar is disposed around the overlapping joint and spaced portions of the collar are deformed inwardly by electromagnetic energy into contact with the sleeve of the yoke. The deformed portions can be mechanically interlocked with the sleeve by welding or the like. With this construction, the torsional load is transmitted through the deformed portions of the collar and the edges of the tubular member bordering the slots to provide an improved mechanical connection between the fiber reinforced tubular member and the yokes.

8 Claims, 1 Drawing Sheet

METHOD OF FORMING COMPOSITE TUBULAR STRUCTURE

This is a continuation of application Ser. No. 07/305,182, filed Feb. 1, 1989, which is a division of application Ser. No. 07/028,662, filed Mar. 20, 1987, now abandoned.

BACKGROUND OF THE INVENTION

In the past, vehicle drive shafts have been formed of a steel tube having a high flexural modulus with forged steel yokes welded to each end of the steel tube. With both the tube and yokes formed of steel, the drive shaft is a relatively heavy structure. To maintain an acceptably high critical speed with a long tubular steel drive shaft, the drive shaft is often formed of short multiple sections and shaft support bearings are positioned along the length of the drive shaft which act to rotationally support the shaft sections.

Recently there has been considerable activity in the development of composite drive shafts which are composed of a fiber reinforced resin tubular member or shaft and lightweight metal, such as aluminum, yokes. A composite drive shaft achieves a substantial weight reduction as compared to a steel drive shaft and due to the lighter weight, a one-piece composite shaft can replace the multi-sectioned steel shafts, with the resultant elimination of the shaft support bearings which are utilized with a multi-sectioned steel shaft.

A problem in the fabrication of a composite drive shaft has been the lack of an adequate connection between the fiber reinforced resin tube and the yokes. In one approach to providing an adequate connection between the tube and the yokes, the ends of the tube, which surround the sleeve portion of the yoke, are connected to the sleeve portion by rivets. In another approach, as shown in U.S. Pat. No., 4,279,275, the sleeve portion of the yoke is provided with a plurality of longitudinally extending grooves and the resin impregnated fibrous material is wound over the grooves to provide an improved mechanical connection between the tube and the yokes.

In U.S. Pat. No. 4,358,284, the sleeve portion of the yoke is formed with circumferentially extending grooves or threads and the fibrous material is wound in the grooves to provide an improved attachment, while in U.S. Pat. No. 4,380,443, a series of angularly extending pins are employed to interconnect the wound tube with the sleeve portion of the yoke.

U.S. Pat. No. 4,248,062 proposes to increase the bond between the wound tube and the sleeve portion of the yoke by employing a specific winding pattern including longitudinal helical and circumferential windings.

SUMMARY OF THE INVENTION

The invention is directed to a composite tubular structure, such as a drive shaft, and having an improved attachment between the fiber reinforced resin tubular member and the metal yokes. In accordance with the invention, the ends of the tubular member are formed with circumferentially spaced, longitudinal slots and the slotted ends of the tubular member are positioned in overlapping relation around the cylindrical sleeve portions of the respective metal yokes.

A thin metal ring or collar is positioned around the overlapping joint between the tubular member and the sleeve of the yoke and spaced portions of the ring aligned with the slots are deformed inwardly through electromagnetic energy to bring the deformed portions into contact with the sleeve. An additional interlock can be obtained by connecting the deformed portions of the ring to the underlying sleeve by welds, or other mechanical fasteners.

The invention provides an improved connection between the fiber reinforced resin tubular member or shaft and the yokes in which the torsional load is transmitted through the deformed portions of the ring and the edges of the tubular member bordering the slots.

As the drive shaft of the invention is formed of a fiber reinforced resin tube and aluminum yokes, a substantial weight reduction is achieved over a conventional steel drive shaft and operational noise and vibration are also reduced.

The composite drive shaft of the invention can be used for relatively long drive shafts and eliminates the need for shaft support bearings which are required in multi-sectioned steel drive shafts.

Through use of the fiber reinforced tubular member along with forged aluminum yokes, the drive shaft is corrosion resistant.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

The drawings illustrate a composite drive shaft composed of a fiber reinforced resin tubular member or shaft 1 and a pair of metal yokes 2 formed of aluminum, or the like, are connected to the ends of tubular member 1.

Tubular member 1 is formed of a fibrous material, such as glass fibers, or a combination of glass and graphite fibers, which are wound in a pattern to provide the desired mechanical properties in the tubular member. A combination of different winding patterns can be used, such as substantially circumferential windings, helical windings, and substantially longitudinal windings. The particular winding pattern and fibrous material employed in forming tubular member 1 is conventional and is not critical to the invention.

The fibrous material of tubular member 1 is bonded together by a cured thermosetting resin, such as an epoxy or polyester resin.

Figure 1:
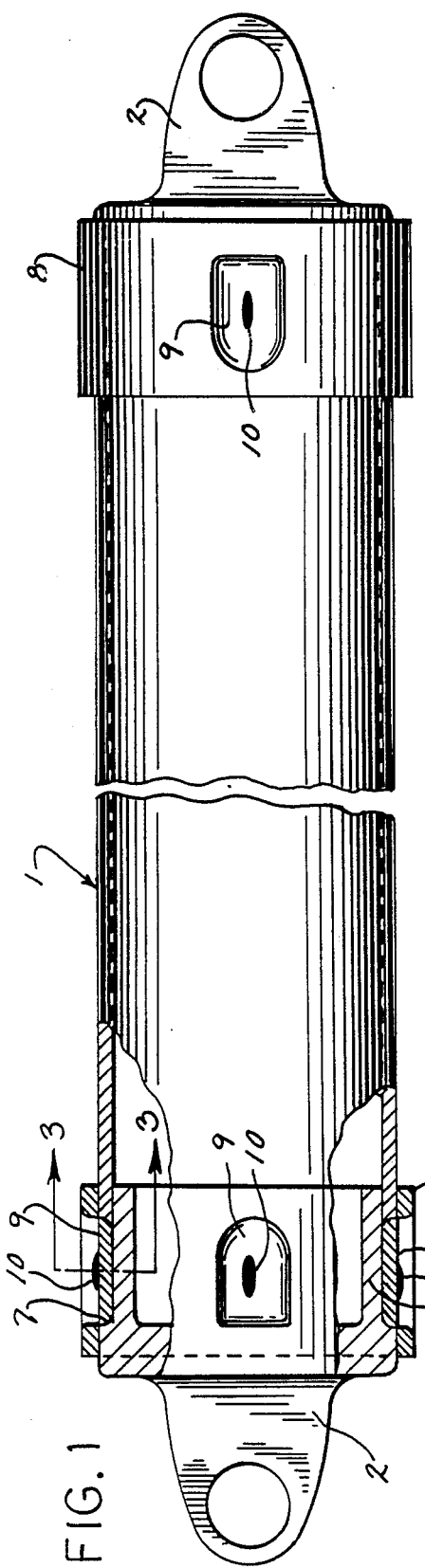
FIG. 1 is an exploded perspective view showing an end of the fiber reinforced resin tubular member along with a yoke and the connecting metal ring.

As best shown in FIG. 1, each yoke 2 is formed with a generally cylindrical sleeve portion 3, which is disposed in lapping relation within the corresponding end of tubular member 1.

In accordance with the invention, the ends of tubular member 1 are formed with a series of circumferentially spaced, longitudinal slots 4. Each slot is bordered by a pair of generally parallel side edges 5, which terminate in a rounded base 6.

Figure 2:
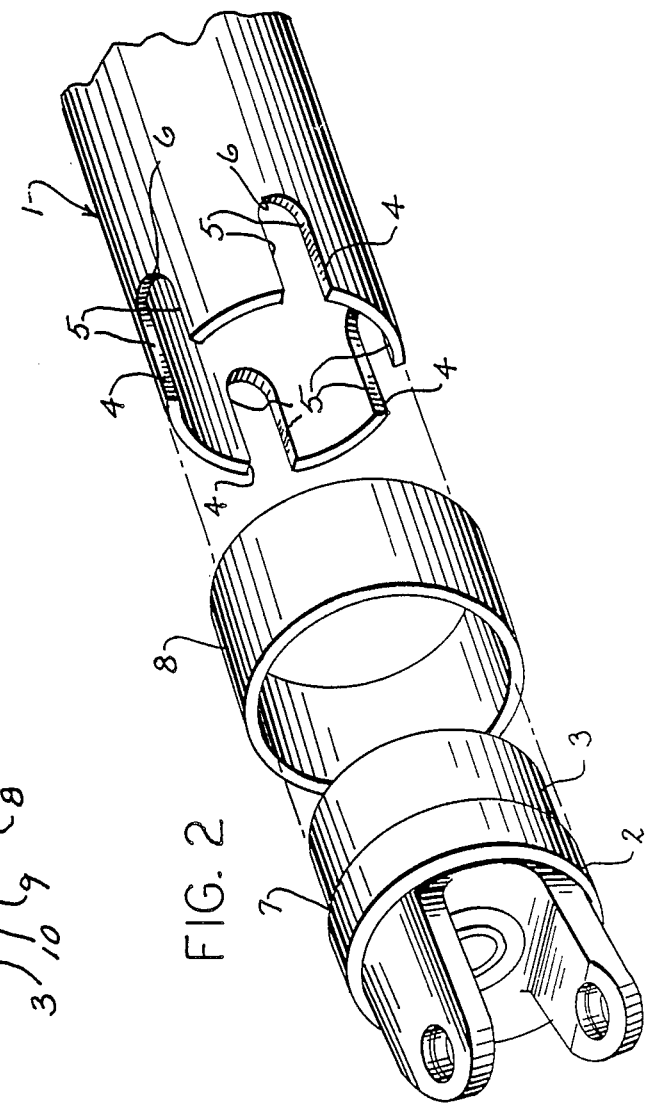
FIG. 2 is a side elevation of the composite drive shaft with parts broken away in section.

When tubular member 1 is inserted over the sleeve 3, the end of the tubular member will engage or bottom out against a circumferential flange 7 on yoke 2, as shown in FIG. 2.

The contacting surfaces of tubular member 1 and sleeves 3 can be bonded together, preferably by a thermosetting resin or an adhesive system.

A thin metal collar or ring 8 is positioned around the overlapping joint between the tubular member 1 and sleeve 3. Ring 8 is formed of a light to medium gauge metal having relatively high electrical conductivity and can take the form of aluminum, copper, low carbon steel, or brass. Circumferentially spaced portions 9 of ring 8 are deformed inwardly through slots 4 and into contact with the underlying sleeve 3 by an electromagnetic forming or swaging process. The electromagnetic forming process is a conventional process, as described in U.S. Pat. Nos. 2,976,907, 3,247,040 and 3,383,890. In the electromagnetic forming process, an electric current generates a pulsed magnetic field near the metal conductor and a controllable pressure is created that can shape or deform the metal ring 8, without physical contact.

Figure 3:
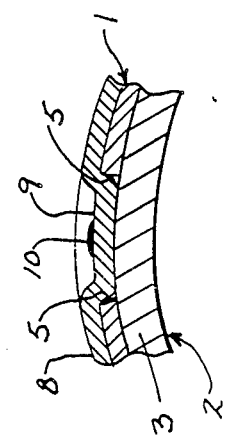
FIG. 3 is a section taken along line 3—3 of FIG. 2.

The basic components of the electromagnetic forming process are an energy storage capacitor, a work coil and switching devices. The high voltage capacitors are charged and discharged through a coil inducing an extremely intense magnetic field. The magnetic field, in turn, induces current in the conducting workpiece or ring, setting up an opposing magnetic field. The net magnetic force deforms the spaced portions 9 of ring 8 into the slots 4, as best shown in FIG. 3.

To increase the attachment between the deformed portions 9 and sleeves 3, the portions 9 can be welded to the underlying sleeve, as indicated by welds 10. Alternately, other types of mechanical fasdteners, such as screws, bolts, pins, or the like, can be used to provide a mechanical connection between portions 9 and sleeve 3.

To produce the composite drive shaft of the invention, the tubular member 1 is wound by conventional filament winding techniques and after curing of the thermosetting resin, slots 4 are cut into the ends of the tubular member. The ends of the tubular member are then assembled over the sleeves 3 with rings 8 positioned over the respective overlapping joints. The joint area is then subjected to the electromagnetic forming process, causing the spaced portions 9 of the ring to be deformed inwardly through slots 4 into contact with sleeve 3. Following the electromagnetic forming treatment, the portions 9 can be welded as shown by 10, or otherwise secured to the underlying sleeve 3 to complete the assembly.

The invention provides an improved mechanical connection between the fiber reinforced resin tubular member and the metal yokes, in which the torsional load is transmitted between the deformed sections 9 of the ring and the edges 5 bordering slots 4 rather than merely through adhesive bonded interfaces between the members.

While the above description has illustrated the invention as applied to a composite vehicle drive shaft, it is contemplated that the composite shaft can be used in other load transmitting applications. Similarly, in place of slots 4 that open at the end of the tubular member, it is apparent that the end portion of the tubular member can be formed with holes or openings through which the ring 8 can be deformed into contact with sleeve 3.

Various modes of carrying out the invention are contemplated as being within the scope of the following claims particularly pointing out and distinctly claiming the subject matter which is regarded as the invention.

I claim:

1. A method of forming a composite shaft construction, comprising the steps of forming a tubular member of fibrous material bonded with a cured thermosetting resin, forming a plurality of spaced openings in an end of said tubular member, positioning said end in overlapping contacting relation to a cylindrical sleeve portion of a metal yoke to provide an overlapping joint, positioned a continuous cylindrical metal collar around said joint, and applying electromagnetic energy to said collar of sufficient intensity to deform spaced portions of said collar through said openings and into contact with said sleeve portion.

2. The method of claim 1, and including the step of securing said deformed portions to said sleeve portion.

3. The method of claim 2, wherein said step of securing said deformed portions of said sleeve portion comprising welding.

4. The method of claim 1, wherein said tubular member is formed of substantially continuous fibrous strands.

5. The method of claim 1, wherein the step of forming said openings comprises forming a plurality of generally parallel longitudinally extending slots in said end.

6. A method of forming a composite shaft construction, comprising the steps of forming a tubular member of fibrous material bonded with a cured thermosetting resin, forming a plurality of generally parallel longitudinally extending slots in an end portion of said tubular member, positioning said end portion in overlapping contacting relation to a cylindrical sleeve portion of a metal yoke to provide an overlapping joint, positioning a continuous cylindrical metal collar around said joint, applying electromagnetic energy to said collar of sufficient intensity to deform spaced portions of said collar through said openings and into contact with said sleeve portion, and securing said deformed portions to said sleeve portion.

7. A method of forming a composite shaft construction, comprising the steps of forming a tubular member of fibrous material bonded with a cured thermosetting resin, forming a plurality of longitudinally elongated slots through an end of said tubular member, positioning said end in overlapping contacting relation to a cylindrical sleeve portion of a metal yoke to provide an overlapping joint, said sleeve portion being exposed through said slots, positioning a continuous uninterrupted metal ring around said joint, and deforming spaced portions of said ring through said slots to provide inwardly deformed longitudinally elongated circumferentially spaced sections offset radially inward and disposed in contact with said sleeve portion.

8. The method of claim 7, and including the step of securing said deformed sections to said sleeve portion.

* * * * *

UNITED STATES PATENT AND TRADEMARK OFFICE
CERTIFICATE OF CORRECTION

PATENT NO. : 4,930,204

DATED : June 5, 1990

INVENTOR(S) : ROBERT M. SCHURTER

It is certified that error appears in the above-identified patent and that said Letters Patent is hereby corrected as shown below:

Col. 4, lines 15-16, CLAIM 1, Delete "positioned" and substitute therefor ---positioning---; Col. 4, Lines 24, CLAIM 3, Delete "of" and substitute therefor ---to---; Col. 4, lines 25-26, CLAIM 3, Delete "comprising" and substitute therefor ---comprises---

Signed and Sealed this

Fifth Day of November, 1991

Attest:

HARRY F. MANBECK, JR.

*Attesting Officer*   *Commissioner of Patents and Trademarks*